United States Patent [19]

Kawashima et al.

[11] Patent Number: 4,986,796
[45] Date of Patent: Jan. 22, 1991

[54] HYDRAULIC AUTOTENSIONER

[75] Inventors: Kazuki Kawashima; Hisashi Hayakawa, both of Iwata, Japan

[73] Assignee: NTN Corporation, Osaka, Japan

[21] Appl. No.: 485,664

[22] Filed: Feb. 27, 1990

[51] Int. Cl.$^5$ .............................................. F16H 7/08
[52] U.S. Cl. ...................................... 474/101; 474/110
[58] Field of Search ................ 474/101, 110, 113–117, 474/136, 138; 44/70–71; 560/155–158

[56] References Cited

U.S. PATENT DOCUMENTS

| | | | |
|---|---|---|---|
| 4,909,777 | 3/1990 | Inoue et al. | 474/110 |
| 4,911,679 | 3/1990 | Inoue et al. | 474/110 |
| 4,936,868 | 6/1990 | Johnson | 44/71 |
| 4,946,473 | 8/1990 | Johnson | 44/71 |
| 4,950,209 | 8/1990 | Kawashima et al. | 474/110 X |

Primary Examiner—Thuy M. Bui
Attorney, Agent, or Firm—Armstrong, Nikaido, Marmelstein, Kubovcik and Murray

[57] ABSTRACT

An autotensioner for controlling the tension of a belt. It is filled with a hydraulic oil containing poly-α-olefin as a basic ingredient. Since such an oil has excellent viscosity-temperature properties as well as good lubricating properties, a body and a piston slidably mounted in the body are abraded less at their sliding surface than with a prior art autotensioner and thus the size of an oil leakage gap formed therebetween is less subject to change. This will prevent cavitation in a pressure chamber formed in the body.

1 Claim, 3 Drawing Sheets

HYDRAULIC AUTOTENSIONER

The present invention relates to a hydraulic autotensioner for keeping constant the tension of a belt such as a timing belt for driving cams in an automobile engine.

A direct-acting hydraulic autotensioner for a timing belt in an automobile engine is disclosed in Japanese Examined Utility Model Publication No. 63-29964 or Japanese Unexamined Patent Publication No. 63-120949.

FIG. 3 shows such a known autotensioner which comprises a body 30 and a piston 32 slidably mounted in the body 30 so as to form an oil-leaking gap 31 therebetween. The piston 32 divides the interior of the body 30 into a pressure chamber 33 and a reservoir chamber 34. Both chambers are filled with hydraulic oil.

The piston 32 is formed with a channel 35 through which the pressure chamber 33 and the reservoir chamber 34 communicate with each other. A check valve 36 is provided at the bottom opening of the channel 35 to prevent the hydraulic oil in the pressure chamber 33 from flowing into the reservoir chamber 34.

A push rod 37 is connected to the top end of the piston 32. A pressure control spring 38 is mounted in the pressure chamber 33 to bias the push rod 37 through the piston 32 in such a direction as to protrude from the body 30.

If such a hydraulic autotensioner is applied to an automobile engine to adjust the tension of its cam-driving timing belt, a high-frequency variable load synchronized with the rotation of the engine will act on the autotensioner, thereby causing the pressure in the pressure chamber 33 to change over between positive and negative at a high rate as shown in FIG. 4.

As shown in FIG. 5, while the pressure chamber 33 is put under positive pressure, hydraulic oil will leak from the pressure chamber 33 to the reservoir chamber 34 through the gap 31. The piston 32 will move toward the pressure chamber 33 at a speed corresponding to the rate of leakage of oil. In the following description, such a movement of the piston 32 toward the pressure chamber 33 is referred to as "leak-down" and the time required for the piston 32 to move by a predetermined distance toward the pressure chamber 33 is referred to as "leak-down time".

The size of the gap 31 and the viscosity of the hydraulic oil used determine the amount of hydraulic oil which flows from the pressure chamber 33 into the reservoir chamber 34 while the former is under positive pressure, and thus the leak-down time.

On the other hand, when the pressure chamber 33 is under negative pressure, the check valve 36 will be opened as shown in FIG. 6, thus allowing the hydraulic oil to flow from the reservoir chamber 34 back to the pressure chamber 33. The degree of negative pressure in the pressure chamber 33 depends on the amount of oil flowing through the channel 35.

If the absolute value of the negative pressure in the pressure chamber 33 exceeds a certain level, cavitation occurs, which lowers the stiffness of the pressure chamber 33 remarkably. One countermeasure against the development of cavitation is to reduce the amount of hydraulic oil which flows into the reservoir chamber 34 while the pressure chamber 33 is under positive pressure. In such a case, it is necessary to control the leak-down time. To control the leak-down time precisely, it is necessary to use a hydraulic oil, the viscosity of which is less subject to change with temperature.

For this purpose, a silicone oil is usually selected as the hydraulic oil for a prior art autotensioner because it is superior in the viscosity-temperature properties to any other oil.

One problem in using silicone oil in an autotensioner is that because of its bad lubricating properties, the sliding surface between the piston 32 and the body 30 tends to abrade gradually, thereby widening the oil leaking gap 31 with time. This will shorten the leak-down time.

Further, the wear particles produced by the abrasion of the wearing surface might clog the check valve 36 and make it inoperative, as a result, the autotensioner will lose its damping capability and thus stiffness. This might cause the belt B to skip teeth.

It is also a common practice to use an alkyl-modified silicone oil, which is known to have particularly excellent lubricating properties and reduce the abrasion loss. But it is difficult to noticeably improve the lubricating properties since it contains silicone oil as a basic ingredient.

It is an object of the present invention to provide an autotensioner which is less liable to abrasion at the wearing surface between the piston and the body and thus has a long service life.

Other features and objects of the present invention will become apparent from the following description taken with reference to the accompanying drawings.

DESCRIPTION OF THE PREFERRED EMBODIMENT

Figure 1:
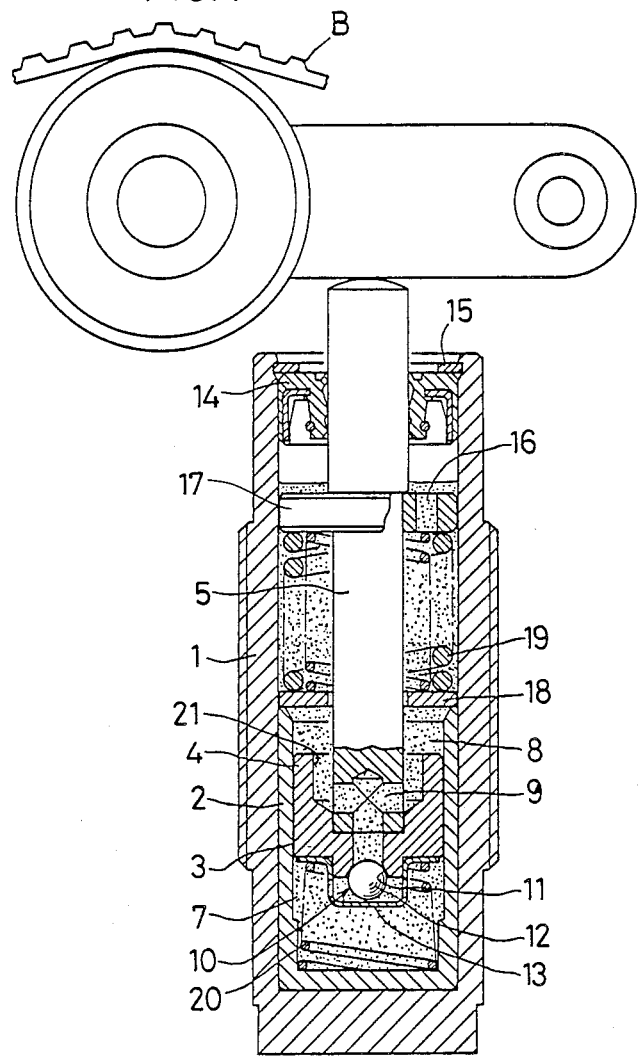
FIG. 1 is a sectional view of the autotensioner embodying the present invention.

Now referring to FIG. 1, the autotensioner according to the present invention comprises a body 1, a cylinder 2 mounted in the body 1, a piston 4 slidably mounted in the cylinder 2 so that an oil leaking gap 3 will be formed therebetween, and a push rod 5 having one end thereof connected to the top of the piston 4 and the other end protruding from the body 1 through an opening formed in the top surface of the body 1. The piston 4 divides the interior of the cylinder 2 into a pressure chamber 7 and a reservoir chamber 8. Both chambers 7 and 8 are filled with a hydraulic oil, that is, an oil containing poly-α-olefin as a basic ingredient.

The pressure chamber 7 and the reservoir chamber 8 communicate with each other through a channel 9 formed in the piston and the lower part of the push rod 5. The channel 9 is opened and closed by a check valve 10 comprising a ball 12 movable toward and away from a seating face 11 formed on the bottom end of the channel 9, and a retainer 13 for retaining the ball 12. While the pressure chamber 7 is put under higher pressure than the reservoir chamber 8, the ball 12 will be pressed against the seating face 11 to close the channel 9. When the pressure chamber 7 is put under lower pressure than the reservoir chamber 8, it will move away from the seating face 11 to open the channel 9.

A seal member 14 is fitted in the body 1 at its top portion and has its outer periphery in close contact with the inner peripheral wall of the body 1 and its inner periphery in close contact with the outer periphery of the push rod 5 to prevent the leakage of the hydraulic oil and air in the reservoir chamber 8. A stopper ring 15 is secured to the inner surface of the body 1 on the seal member 14 to prevent it from coming off.

A spring 19 is mounted around the push rod 5 and has its one end supported on an upper spring bearing 17 secured to an upper portion of the push rod 5 and the other end supported on a lower spring bearing 18 to press it against the top end of the cylinder 2 and bias the push rod 5 upwardly. The upper spring bearing 17 has an air passage 16.

A pressure control spring 20 mounted in the pressure chamber 7 also serves to bias the piston 4 upwards.

The biasing force of the pressure control spring 20 and that of the spring 19 are applied to the belt B through the push rod 5. If the tension of the belt B changes, the piston 4 and the push rod 5 will be moved up and down to keep constant the tension of the belt B.

If the tension of the belt B increases, the push rod 5 and thus the piston 4 will be pushed down. This will increase the pressure in the pressure chamber 7, thus allowing the hydraulic oil in the pressure chamber 7 to leak through the gap 3 into the reservoir chamber 8. The piston 4 will descend at a speed corresponding to the rate of leakage of oil to dampen a sharp increase in the tension of the belt B.

If the tension of the belt B decreases and the belt slackens, the piston 4 will rise biased by the pressure control spring 20 and the spring 19 to remove the slackness of the belt. As the piston 4 rises, the pressure in the pressure chamber 7 will get lower than that in the reservoir chamber 8, thus allowing the hydraulic oil in the reservoir chamber 8 to flow back into the pressure chamber 7 through the channel 9.

The hydraulic oil filling the autotensioner is an oil containing poly-α-olefin as a basic ingredient. Because of its excellent lubricating properties, the cylinder 2 and the piston 4 will scarcely abrade at their wearing surface. Thus the oil leakage gap 3 can keep its size unchanged.

The oil containing poly-α-olefin as a basic ingredient may be poly-α-olefin oil or a mixture of poly-α-olefin oil and polyol ester oil. The temperature-viscosity characteristics of these oils are shown in FIG. 2 which also shows those of a silicone oil and a mineral oil for comparison purposes.

Figure 2:
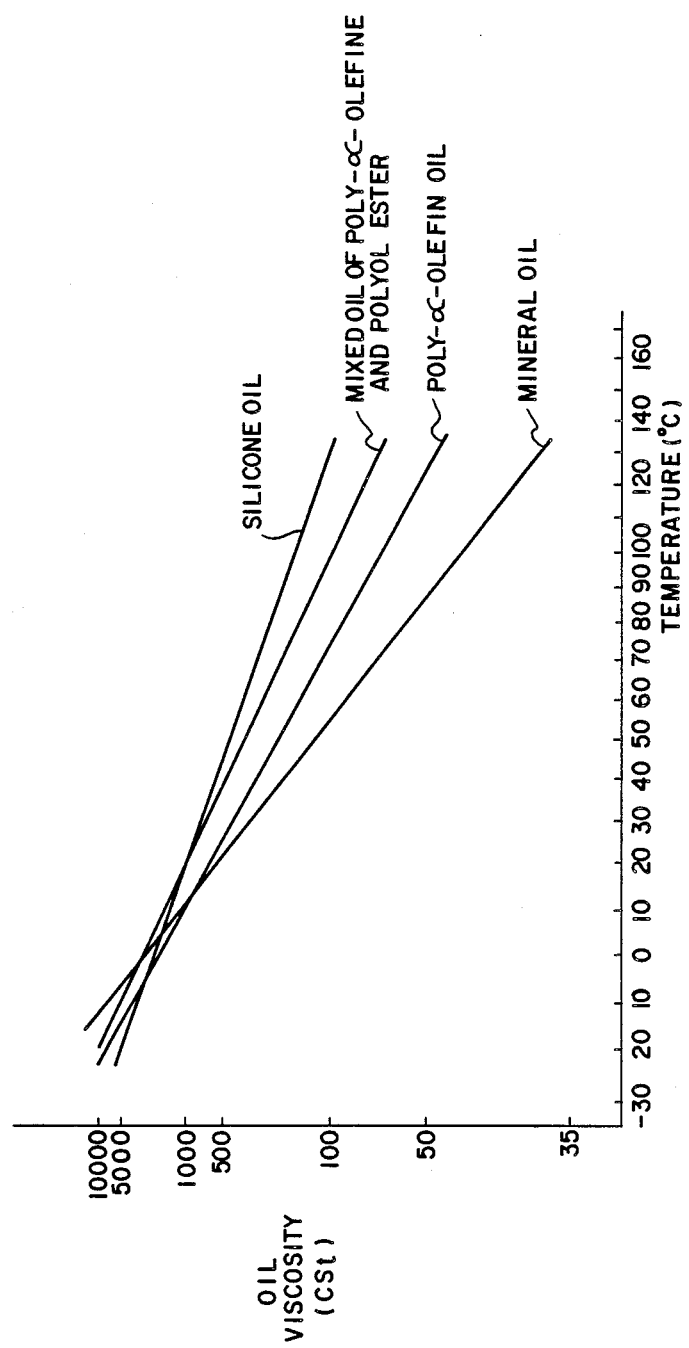
FIG. 2 is a graph showing the temperature-viscosity characteristics of various kinds of oils.
Figure 3:
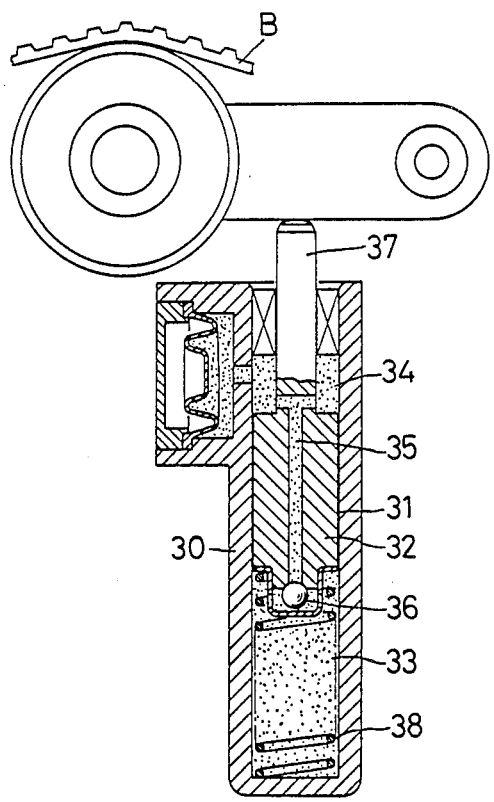
FIG. 3 is a sectional view of a conventional autotensioner.
Figure 5:
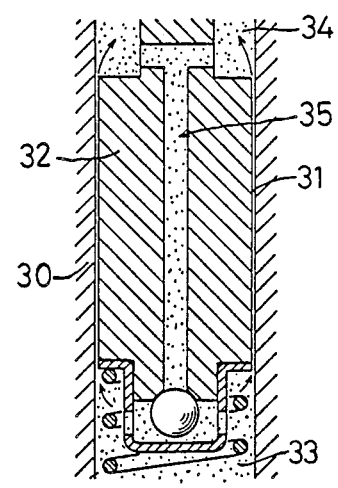
FIGS. 5 and 6 are sectional views of the autotensioner of FIG. 3, showing how it operates.
Figure 4:
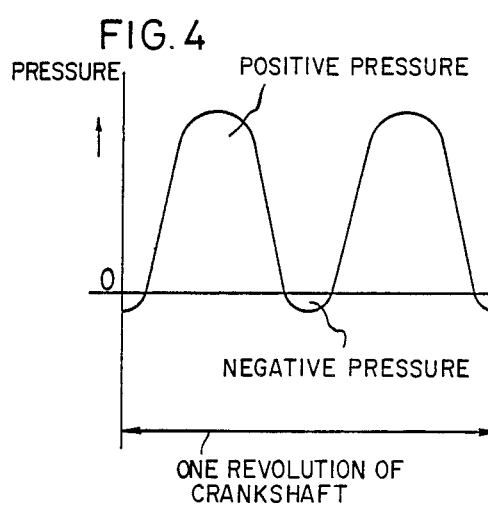
FIG. 4 is a graph showing how the pressure on the autotensioner of FIG. 3 fluctuates.
Figure 6:
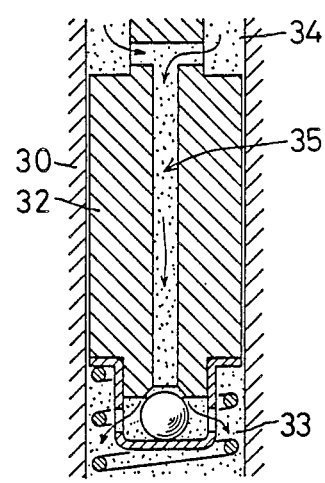

As is apparent from FIG. 2, the oils containing poly-α-olefin as a basic ingredient have better viscosity-temperature characteristics than a mineral oil, though not better than silicone oil. Thus, with the autotensioner using such an oil as the hydraulic oil, the leak-down time can be kept from fluctuating excessively with the fluctuation of temperature. As a result, cavitation in the pressure chamber can be prevented.

In this embodiment, in order to prevent cavitation more effectively, the piston 4 is formed in its top surface with a deep counterbore 21 so as to increase the area of the top opening of the channel 9.

This arrangement serves to reduce the resistance to the flow of hydraulic oil through the channel 9 from the reservoir chamber 8 to the pressure chamber 7 and thus to prevent the pressure in the pressure chamber 7 from dropping excessively. Thus no cavitation will occur in the pressure chamber.

As described above, fluctuation of the leak-down time is a leading cause of cavitation. On the other hand, the leak-down time is subject to change not only with the change in the size of the oil leakage gap 3 but also due to delayed movement of the ball 12 of the check valve 10 to its open or closed position.

The autotensioner according to the present invention was mounted on an engine, with the stroke of the ball 12 set to various values, to check to see if cavitation occurs. The results are shown in Table 1.

TABLE 1

| Ball stroke | Engine speed | | | |
|---|---|---|---|---|
| | 2,500 rpm | 5,500 rpm | 6,000 rpm | 6,500 rpm |
| 0.10 mm | O | O | O | O |
| 0.15 | O | O | O | O |
| 0.30 | O | O | O | O |
| 0.45 | O | O | X | X |
| 1.0 | X | X | X | X |

O: No cavitation occurred.
X: Cavitation occurred.

The results show that the higher the rpm of the engine, the narrower the optimum range of stroke of the ball 12. Although it is difficult to determine the optimum range of stroke numerically because it depends on the type of engine, the stroke of the ball 12 should preferably be larger than zero and no more than 0.3 millimeter. The ball 12 should be as light as possible, because if it has a large inertia, it cannot move to its open or closed position as quickly as required. For this purpose, the ball may be made of ceramics.

What is claimed is:

1. An autotensioner filled with a hydraulic oil containing poly-α-olefin as a basic ingredient.

* * * * *

UNITED STATES PATENT AND TRADEMARK OFFICE
CERTIFICATE OF CORRECTION

PATENT NO. : 4,986,796

DATED : January 22, 1991

INVENTOR(S) : Kazuki KAWASHIMA et al

It is certified that error appears in the above-identified patent and that said Letters Patent is hereby corrected as shown below:

On the cover page, after Item [22], the following should appear:

-- [30]    Foreign Application Priority Data

Mar. 16, 1989 [JP] Japan . . . . . . . . . . 1-64090 --.

Signed and Sealed this

Thirteenth Day of April, 1993

Attest:

STEPHEN G. KUNIN

*Attesting Officer*    Acting Commissioner of Patents and Trademarks